United States Patent
Kim

(10) Patent No.: US 6,840,542 B2
(45) Date of Patent: Jan. 11, 2005

(54) SIDE MEMBER FOR USE IN VEHICLE FRAME AND METHOD OF MANUFACTURING THE SAME

(75) Inventor: Koo-Hyun Kim, Shiheung-shi (KR)

(73) Assignee: Kia Motors Corporation, Seoul (KR)

(*) Notice: Subject to any disclaimer, the term of this patent is extended or adjusted under 35 U.S.C. 154(b) by 20 days.

(21) Appl. No.: 10/215,558

(22) Filed: Aug. 8, 2002

(65) Prior Publication Data

US 2003/0197362 A1 Oct. 23, 2003

(30) Foreign Application Priority Data

Apr. 18, 2002 (KR) ........................................ 2002-21337

(51) Int. Cl.⁷ .............................................. B62D 21/15
(52) U.S. Cl. ..................... 280/784; 188/377; 296/87.09
(58) Field of Search ................................ 280/784, 797; 188/377; 296/187.09

(56) References Cited

U.S. PATENT DOCUMENTS

| | | | | | |
|---|---|---|---|---|---|
| 3,412,628 A | * | 11/1968 | De Gain | ...................... | 74/492 |
| 5,293,973 A | * | 3/1994 | Thum | .......................... | 188/377 |
| 5,611,568 A | * | 3/1997 | Masuda | ...................... | 280/784 |
| 6,293,587 B1 | * | 9/2001 | Lapic et al. | ................. | 280/784 |

OTHER PUBLICATIONS

Kim et al., Axial Crush and Energy Absorption Characteristics of Aluminum/GFRP Hybrid Square Tubes, Journal of KSAE, vol. 6, No. 8, Dec. 2000, p. 208–219.*

* cited by examiner

Primary Examiner—Ruth Ilan
(74) Attorney, Agent, or Firm—Morgan Lewis & Bockius LLP

(57) ABSTRACT

Disclosed are a side member of a vehicle frame and a method of manufacturing the same. One end of the side member is connected to a bumper. The side member comprises a steel tube, and a hybrid tube disposed between the steel tube and the bumper and connected to the steel bumper. The hybrid tube has a dual structure including an aluminum tube and a hybrid tube made of a glass fiber reinforced composite material and formed on an outer circumstance of the aluminum tube. The method comprises the steps of preparing a hybrid tube having a dual structure including an interior aluminum tube and an exterior hybrid tube made of a glass fiber reinforced composite material; and connecting the hybrid tube to a steel tube.

13 Claims, 4 Drawing Sheets

SIDE MEMBER FOR USE IN VEHICLE FRAME AND METHOD OF MANUFACTURING THE SAME

FIELD OF THE INVENTION

The present invention relates to a reinforcement of a vehicle frame, and more particularly, to an improved side member and a method for manufacturing the same.

BACKGROUND OF THE INVENTION

Generally, a bumper structure of a vehicle includes bumper brackets mounted on each front of side members through bumper stay reinforcements. When the vehicle is involved in a front-end collision, the front side members and the bumper brackets collapse in a longitudinal direction thereof to absorb the energy of impact.

Various attempts have been made to provide lighter weight side members with good energy absorption qualities, while maintaining a low cost and ease of manufacturing. See, for example, *Axial Crush and Energy Absorption Characteristics of Aluminum/GFRP hybrid Square Tubes*, Journal of the KSAE (Korean Society of Automobile Engineering), Vol. 8, No. 6, December 2000. However, to date, fully satisfactory results have not been widely achieved at levels sufficient to reduce costs and ease manufacturing.

SUMMARY OF THE INVENTION

The present invention provides a side member of a vehicle frame, one end of which may be connected to a bumper. Preferably the side member comprises a steel tube and a hybrid tube. The hybrid tube is located to be disposed between the steel tube and the bumper, and connected to the steel bumper. The hybrid tube has a dual structure including an aluminum tube and a tube made of a glass fiber reinforced composite material formed on an outer circumstance of the aluminum tube.

In a preferred embodiment, one end of the hybrid tube is inserted into an end of the steel tube to such an extent that the steel tube is partially superposed on the hybrid tube, and the superposed portion of the steel tube and hybrid tube is fastened by at least one fastening member.

According to another aspect of the present invention, there is provided a method of manufacturing a side member of a vehicle frame, the method comprising preparing a hybrid tube having a dual structure including an interior aluminum tube and an exterior hybrid tube made of a glass fiber reinforced composite material, and connecting the hybrid tube to a steel tube.

The preparing step may comprise forming a fiber preform enclosing an outer circumference of the interior aluminum tube, impregnating a resin into the preform, and curing the resin impregnated in the preform. The fiber preform may be formed by winding a glass fiber mat around the outer circumference of the aluminum tube. The glass fiber mat comprises a continuous strand mat and a random chopped strand mat. The resin is preferably an unsaturated polyester, more preferably, a thermosetting resin.

The connecting step may comprise inserting one end of the hybrid tube into an end of the steel tube to such an extent that the steel tube is partially superposed on the hybrid tube, and fastening the superposed portion of the steel tube and hybrid tube by a fastening member. The aluminum tube with the preform formed is preferably inserted into a mold, and the resin is introduced into the mold under a pressured state to impregnate the resin.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Figure 1:
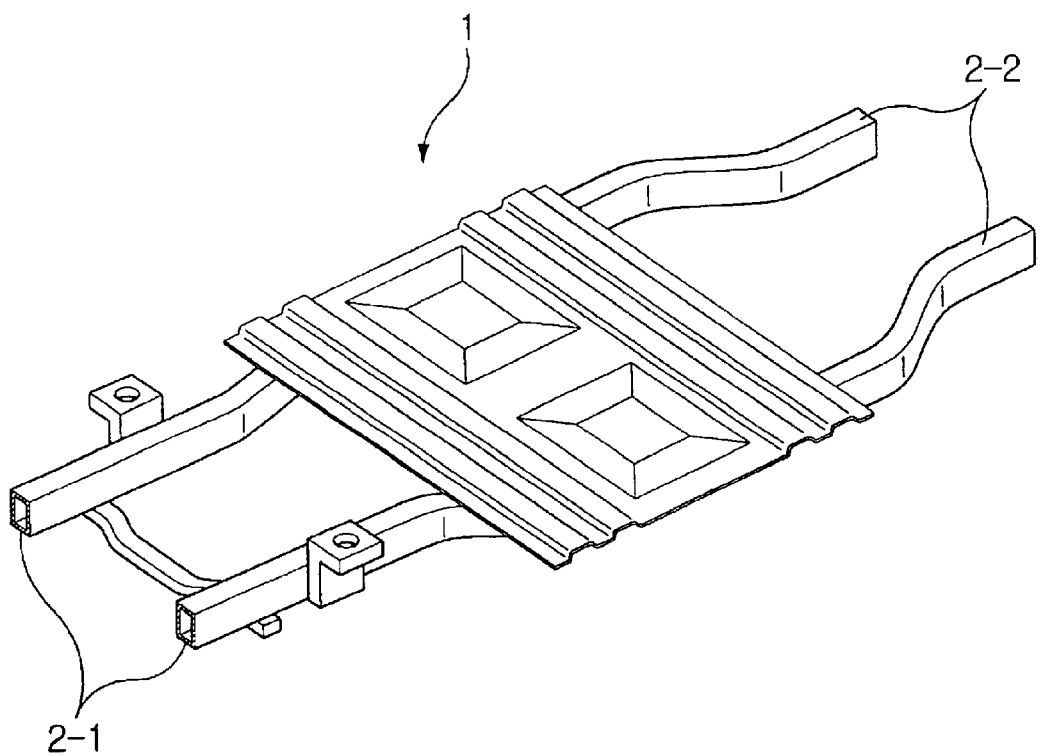
FIG. 1 is a perspective view of a vehicle frame.

As shown in FIG. 1, side members 2-1 and 2-2 are disposed at the front and rear of a vehicle frame 1. The side member is typically box shaped, of closed-sectional member, and extends in a longitudinal direction along the vehicle frame. In particular, the front side member 2-1 is one component of a vehicle body, and should have rigidity sufficient to prevent the engine from penetrating into a cabin and protect the vehicle body upon the front collision. In addition, a reinforcing member may be added to a structurally weakened portion to increase the rigidity. The front side member 2-1 preferably provides impact safety capable of preventing passengers from being injured by absorbing impact energy originating from the collision.

Figure 2:
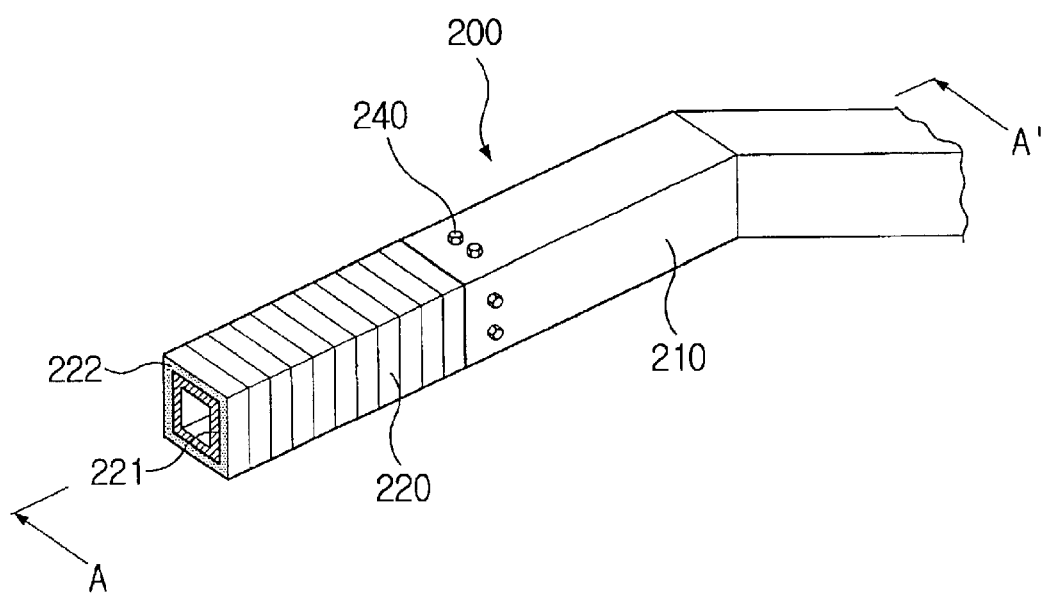
FIG. 2 is a perspective view of a side frame according to a preferred embodiment of the present invention.
Figure 3:
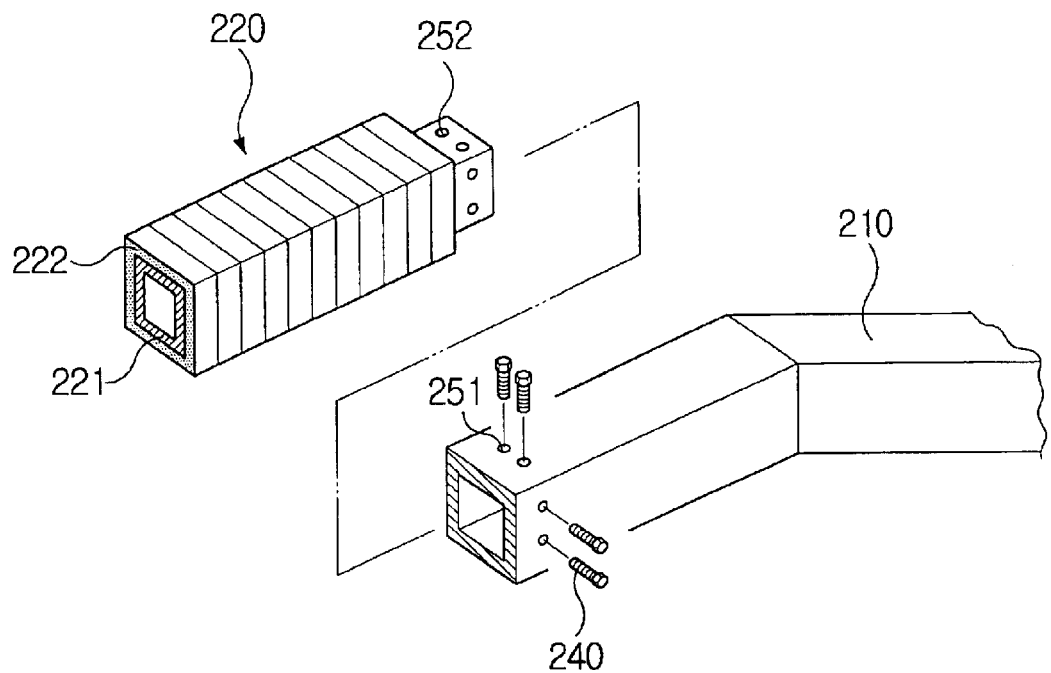
FIG. 3 is an exploded perspective view of a side frame according to a preferred embodiment of the present invention.
Figure 4:
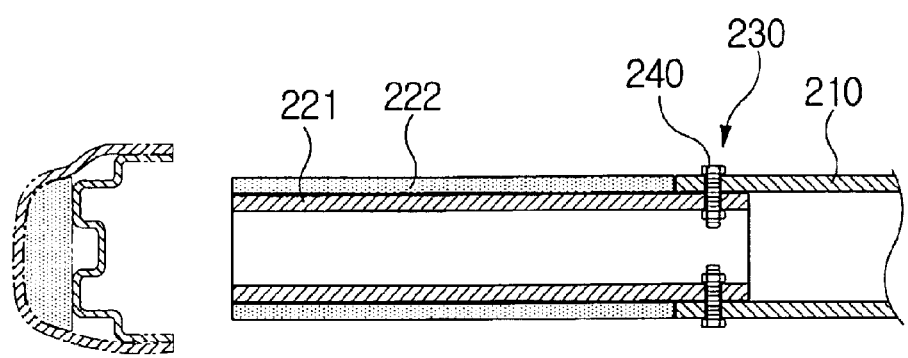
FIG. 4 is a cross sectional view taken along a line A-A' of FIG. 2

A side member 200 according to a preferred embodiment of the present invention comprises, as shown in more detail in FIGS. 2 to 4, a steel tube 210 made of a high strength steel plate, and a hybrid tube 220 disposed between the steel tube 210 and a bumper (shown by a two-dotted line in FIG. 4) and connected to the steel bumper.

The hybrid tube 220 of the present invention has a dual structure including an interior aluminum tube 221 and an exterior hybrid tube 222 made of a glass fiber reinforced composite material. The steel tube 210 and the hybrid tube 220 of the present invention may have a circular or rectangular closed-sectional structure.

The connection of the steel tube 210 and the hybrid tube 220 may be achieved, as shown in FIGS. 3 and 4, by inserting one end of the hybrid tube 220 into an end of the steel tube to such an extent that the steel tube is partially superposed on the hybrid tube, and fastening a superposed portion 230 of the steel tube and hybrid tube by use of at least one, preferably at least two, fastening members (e.g., bolt/nut or rivet). To this end, the tubes 210 and 220 are provided at the superposed portion 230 with at least one, preferably at least two, fastening holes 251 and 252 for receiving the bolt or rivet. Accordingly, it is preferable to not laminate the glass fiber reinforced composite material on the end of the hybrid tube which is inserted in the steel tube 210.

Since the hybrid tube 220 of the present invention has the dual structure including of the interior aluminum tube 221 and the exterior tube 222 made of the glass fiber reinforced composite material, the cooperation of the aluminum and the glass fiber reinforced composite material may absorb the impact energy in a stable collapse mode. In addition, in case of a low speed collision unnecessary for replacing the entire side member, only the hybrid tube 222 need be replaced, thereby reducing service expense.

A hybrid tube 222 of an embodiment of the present invention may be manufactured by a resin transfer molding (RTM) method. After a stiffener is previously disposed in a mold, resin is impregnated and cured by applying a pressure from the exterior. This method can manufacture a tube of good mechanical properties in high productivity, and can easily form a large-size component of complicated shape. In addition, a physical property of the article can be improved by regulating amount and orientation of the stiffener.

A preform suitable for a shape of a mold is made by use of a binder. The preform is formed by winding glass wool, such as continuous strand mat or random chopped strand mat, around an outer circumference of the aluminum tube 221 prepared previously. In this case, it is preferable to measure permeability of the preform so as to predict resin flow in the mold.

The aluminum tube with the preform formed is disposed within the mold, and is applied with a pressure from the exterior so that the resin is impregnated into the preform. And then, the impregnated preform is cured. A preferred resin is unsaturated polyester, i.e., a thermosetting resin (100 to 1000 cP) having a relatively low viscosity. Since the unsaturated polyester can be impregnated with a low pressure, it is possible to simplify the forming mechanism and mold of the molding machine, and reduce molding expenses relative to injection molding or compression molding.

Factor exerting an influence on the productivity of the resin transfer molding process are the impregnating and curing processes. Conditions such as pressure, temperature and viscosity and so forth have to be considered at the impregnation of the resin, and to be optimized to obtain the rapid curing and flow by regulating the pressure and temperature.

The hybrid tube 220 made as described above is connected to the steel tube 210 prepared previously. The connection of the steel tube 210 and the hybrid tube 220 is achieved, as described above, by inserting one end of the hybrid tube 220 into the hollow end of the steel tube to such an extent that the steel tube is partially superposed on the hybrid tube, and fastening the superposed portion 230 of the steel tube and hybrid tube through a fastening method such as rivet coupling, bolt/nut fastening, or welding. To the end, the tubes 210 and 220 are provided at the superposed portion 230 with a number of fastening holes 251 and 252.

With the construction described above, since the hybrid tube of the present invention has the dual structure including of the interior aluminum tube and the exterior tube made of the glass fiber reinforced composite material, the cooperation of the aluminum and the glass fiber reinforced composite material may absorb the impact energy in a stable collapse mode. In addition, in case of a low speed collision unnecessary for replacing the entire side member, only the hybrid tube 222 need be replaced, thereby reducing service expense. Furthermore, the front portion of the side member is replaced with the present invention, thereby increasing the lightweight effect. Also, the RTM process is very advantageous for mass production and cost reduction.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A side member of a vehicle frame, wherein one end of the side member is adapted to be connected to a bumper, the side member comprising:
    a steel tube; and
    a hybrid tube disposed on an end of the steel tube and adapted for connection to the bumper opposite said steel tube;
    the hybrid tube having a dual structure comprising an inner aluminum tube and a tube made of a glass fiber reinforced composite material and formed on an outer circumstance of the aluminum tube.

2. The side member as claimed in claim 1, wherein one end of the hybrid tube is inserted into an end of the steel tube to such an extent that the steel tube is partially superposed on the hybrid tube, and the superposed portion of the steel tube and hybrid tube being fastened together.

3. The side member as in claim 2, wherein the steel tube and hybrid tube are fastened together by at least one fastening member.

4. The side member of claim 1, wherein the reinforced composite material includes an unsaturated polyester material.

5. The side member of claim 1, further comprising a fastening element having first and second ends such that one end of the fastening element is located inside the aluminum tube and the other end of the fastening element is located outside the steel tube when the fastening element is positioned to secure the aluminum tube to the steel tube.

6. A side member of a vehicle frame adapted to be connected to a bumper, the side member comprising:
    a steel tube; and
    a hybrid tube having first and second ends, the first end disposed on the steel tube and the second end adapted for connection to the bumper opposite the steel tube;
    the hybrid tube having
        an aluminum tube, and
        a reinforced composite material including
            a preform fiber mat having a measured permeability wound around an outer circumference of the aluminum tube, and
            a cured thermosetting resin dispersed in the preform,
        wherein the measured permeability of the preform allows a thermosetting resin having a relatively low viscosity to flow through the preform in a predictable fashion under low pressure and impregnate the preform prior to curing of the thermosetting resin.

7. The side member of claim 6, wherein the cured resin includes an unsaturated polyester.

8. The side member of claim 6, wherein the end of the hybrid tube disposed on the steel tube does not include the reinforced composite material.

9. The side member of claim 6, wherein the fiber mat is a glass wool.

10. The side member of claim 6, wherein the fiber mat includes a continuous strand mat.

11. The side member of claim 6, wherein the fiber mat includes a chopped strand mat.

12. The side member of claim 6, further comprising a fastening element having first and second ends such that one end of the fastening element is located inside the aluminum tube and the other end of the fastening element is located outside the steel tube when the fastening element is positioned to secure the aluminum tube to the steel tube.

13. A side member of a vehicle frame, wherein one end of the side member is adapted to be connected to a bumper, the side member comprising:

a steel tube; and a hybrid tube disposed on an end of the steel tube and adapted for connection to the bumper opposite said steel tube; wherein, the connection of the steel tube and the hybrid tube is achieved by inserting one end of the hybrid tube into the steel tube to be partially superimposed between both of them, and fastening a superimposed portion of the steel tube and hybrid tube by use of at least one fastening member;

the hybrid tube having a dual structure including an aluminum tube and a tube made of a glass fiber reinforced composite material and formed on an outer circumference of the aluminum tube; and the tube being made of a glass reinforced composite material, is formed by impregnating and curing a unsaturated polyester into a preform formed by winding a glass fiber mat, such as a continuous strand mat or a random chopped strand mat around the outer circumference of the aluminum tube.

* * * * *